United States Patent
Mai et al.

(10) Patent No.: US 6,641,481 B1
(45) Date of Patent: Nov. 4, 2003

(54) SIMPLIFIED MATCHMAKING

(75) Inventors: Jason Mai, Yuma, AZ (US); Justin David Brown, Seattle, WA (US); Hoon Im, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 212 days.

(21) Appl. No.: 09/714,817

(22) Filed: Nov. 17, 2000

(51) Int. Cl.$^7$ ............................................... G06F 17/00
(52) U.S. Cl. .................................... 463/42; 463/29
(58) Field of Search ........................ 463/42, 29

(56) References Cited

U.S. PATENT DOCUMENTS

| | | | | |
|---|---|---|---|---|
| 5,894,556 A | * | 4/1999 | Grimm et al. ................ | 463/42 |
| 5,914,714 A | * | 6/1999 | Brown ......................... | 345/769 |
| 6,023,729 A | * | 2/2000 | Samuel et al. ................ | 463/42 |
| 6,203,433 B1 | * | 3/2001 | Kume .......................... | 463/41 |
| 6,322,451 B1 | * | 11/2001 | Miura .......................... | 463/2 |
| 6,352,479 B1 | * | 3/2002 | Sparks, II .................... | 463/29 |
| 2002/0115488 A1 | * | 8/2002 | Berry et al. .................. | 463/42 |

* cited by examiner

Primary Examiner—Jessica Harrison
Assistant Examiner—Corbett B. Coburn
(74) Attorney, Agent, or Firm—Banner & Witcoff, Ltd.

(57) ABSTRACT

A simplified matchmaker matches users of a computer network, such as the Internet, based on the number of games the users have abandoned. A one-action input is received at a requesting client application executing on a computer connected to the computer network. Next, information that is stored within the computer is collected. The information is stored within the computer using a process that is unrelated to and separate from the one-action input received from the user. Then, at least one message is sent from the requesting client application to a host computer connected to the computer network containing information relating to a request for initiating a matchmaking process on the host computer that matches requesting user into an online interactive session along with other suitable users, such that each suitable user is connected to the computer network through a client application compatible with the requesting client application.

14 Claims, 6 Drawing Sheets

SIMPLIFIED MATCHMAKING

TECHNICAL FIELD

The invention generally relates to online user matching. More particularly, the invention relates to systems and methods for matching suitable users in an interactive online environment.

BACKGROUND OF THE INVENTION

Conventional online matchmaking services typically require users to make several choices and/or search through a list of potential partners as part of a matchmaking process. For example, the MSN® Gaming Zone (Zone.com) and other matchmaking services use a matchmaking model that is based on requiring a user to explore a set of meeting places to find other suitable players. Generally, a user must select a "Room" (or "Lobby") based on a general description of the type of people that can be expect to be found there, or based on different capabilities and settings of the various Rooms. Once in a Room, a user must decide to create a new game instance, or find a game instance that is already created, but is not full. The user then waits until the selected game instance has a sufficient enough players present to begin the game.

This conventional matchmaking model presents many significant usability problems. For example, most novice players find the level of complexity daunting, and more advanced users are frustrated by the amount of time required to find opponents.

Consequently, what is needed is a way to match game players in real-time over a computer network, such as the Internet, so that each user experiences an exceptionally quick and simple online

SUMMARY OF THE INVENTION

The present invention provides a way to match game players in real-time over a computer network, such as the Internet, so that each user experiences an exceptionally quick and simple online matchmaking process.

The advantages of the present invention are provided by a method for matching users over a computer network, such as the Internet, for the purpose of participating in interactive online sessions, in which, through server-side automation, a user need only perform a single client-side action (i.e., a request to be matchmade). The client may optionally gather system and/or user setting information (where the user settings are configurable through a process that is unrelated to the matchmaking process) and send the information to the server along with the matchmaking request so that the server can improve matchmaking decisions.

According to the invention, the one-action input can be a click on a button within a graphical user interface associated with the computer on which the requesting client application is executing, or a single selected keystroke on a keyboard connected to the computer on which the requesting client application is executing. The system and/or user setting information relates to some number of operating parameters of the computer on which the requesting client application is executing and can include some number of user-defined parameters relating to the requesting user. The system and/or user setting information are stored within the computer using a process that is unrelated to and separate from the one-action input received from the user. Then, at least one message is sent from the requesting client application to a host computer connected to the computer network. The message contains information relating to a request for initiating a matchmaking process on the host computer that matches the requesting user with other suitable users, such that each suitable user is connected to the computer network through a client application that is compatible with the requesting client application. When the process completes, at least one message is received from the host computer containing information relating to the other suitable users matched to the requesting user by the matchmaking process on the host computer.

The host computer receives the at least one message from the requesting client application and begins the matchmaking process. Each suitable user determined to match the requesting user is matched to the requesting user during a first predetermined period of time based on a client application corresponding to the requesting client application and on information relating to at least one operating parameter of the computer on which the requesting client application is executing and/or at least one user-defined parameter relating to the requesting user. When the predetermined number of suitable users is not found during the first predetermined period of time, each suitable user determined to match the requesting user is matched to the requesting user during a second predetermined period of time based on a client application corresponding to the requesting client application and on information relating to at least one operating parameter of the computer on which the requesting client application is executing and/or at least one user-defined parameter relating to the requesting user. The restrictions for "suitable user" are more inclusive during the second predetermined period of time. This continues for more predetermined periods of time, with increasingly inclusive restrictions. When all of the predetermined periods of time expire before a predetermined number of suitable users are found, the host computer matches each suitable user determined to match the requesting user based on at least a client application corresponding to the requesting client application and, optionally, on information relating to zero or more operating parameters of the computer on which the requesting client application is executing and/or zero or more user-defined parameters relating to the requesting user, using more inclusive restrictions on "suitable user" than were used during any of the preceding predetermined periods of time. When the requesting user has a predetermined user status with respect to the requesting client application, such as a user status that relates to a predetermined number of abandoned games or a particular skill level, the host computer matches the requesting user during another predetermined period of time with other users that have the predetermined user status with respect to a client application corresponding to the requesting client application, at the expiry of which the user is treated as any other user without a predetermined user status would at the hosts' initial receipt of a matchmaking request. The host computer sends a matchmaking complete message to the requesting user and to each user matched with the requesting user when the matchmaking process has completed (i.e., the user has been matched with a predetermined number of suitable users). The matchmaking message includes information relating to each other user matched with the requesting user.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, game consoles, network PCs, minicomputers, mainframe computers, and the like. The invention is preferably practiced in distributed computing environments where tasks are performed by remote processing devices that are linked through a communications network. In a distributed computing environment, program modules may be located in both local and remote memory storage devices.

Figure 1:
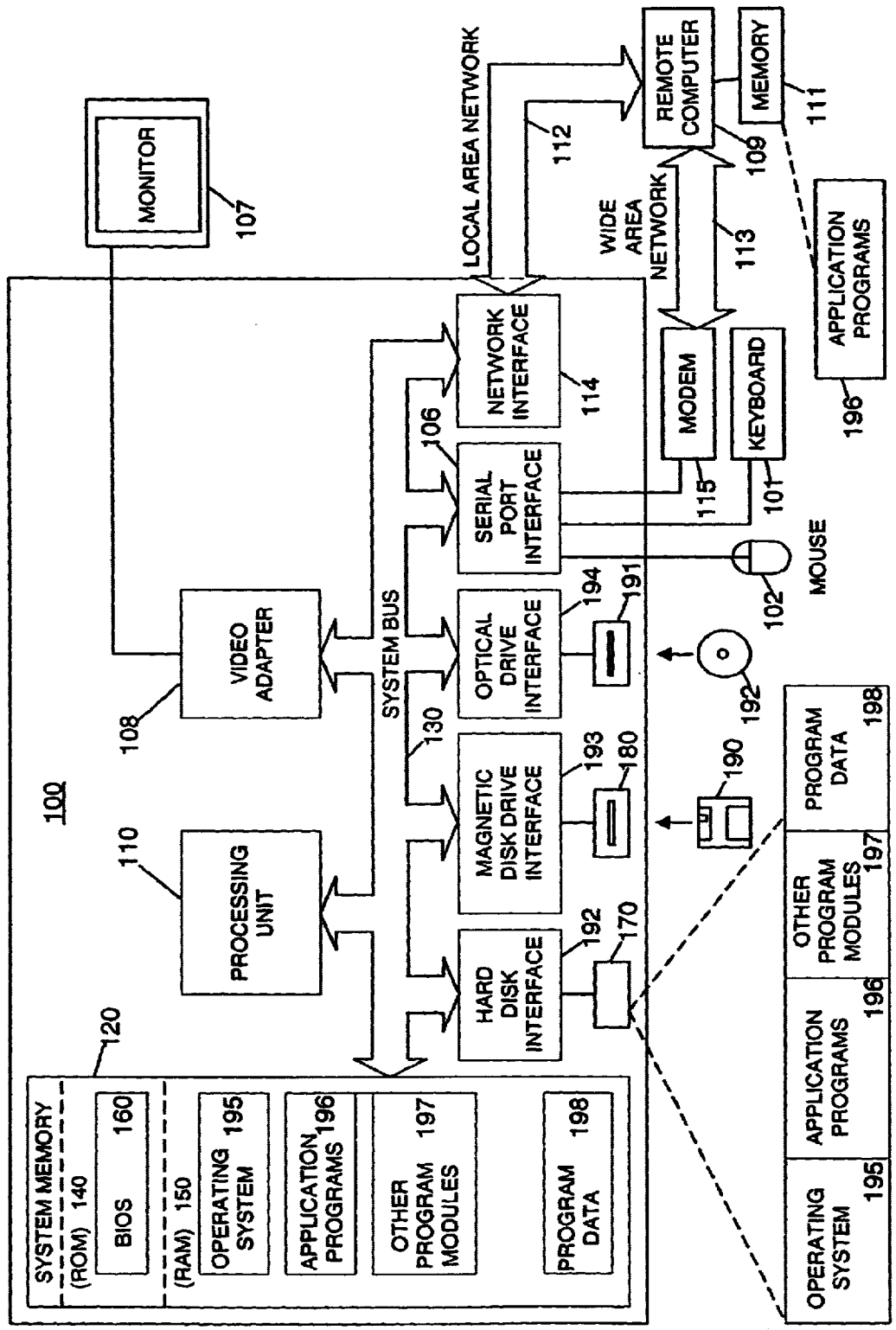
FIG. 1 is a schematic diagram of a conventional general-purpose digital computing environment that can be used to implement various aspects of the present invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on hard disk 170, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the computer 100 typically includes a modem 115 or other device for establishing communications over a wide area network 113, such as the Internet. The modem 115, which may be internal or external, is connected to the system bus 130 via the serial port interface 106. In a networked environment, program modules depicted relative to the computer 100, or portions thereof, may be stored in the remote memory storage device 111.

It will be appreciated that the network connections shown are exemplary and other techniques for establishing a communications link between the computers can be used. The availability of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages A primary aspect of the invention provides a method and system for generating a match between players, i.e., partners and opponents, in real-time over a computer network based on a single action from each player. It will be recognized that the technique for generating a match based on a single user action described below is intended to illustrate one possible method and user interface (UI) for generating the match. Other methods for generating player matching based on a single user action will be apparent to those of ordinary skill upon a reading of this disclosure.

The present invention provides a user interface that matches game players in real-time over a computer network, such as the Internet, based on a single action by a user, such as a single click on a graphical interface button or a single keyboard entry. The invention utilizes back-end server automation for eliminating complexity from the user interface, thereby providing an exceptionally quick and simple experience for the user. In contrast, conventional matchmaking processes require a user to make several choices and/or search through a list of potential players as part of the matchmaking process.

According to the invention, when a user desires to play a game with one or more players over a computer network, only a single user action is necessary for finding the other players. For example, the single user action can be launching a game, clicking a graphically displayed "Find New Opponents" button contained in the game, or a single entry by way of another input device, such as a keyboard. Once the matchmaking process of the present invention has been initiated, back-end servers hosting the game over the computer network use data, such as the users' computer system language setting and/or various other settings, for preferably matching the user with other players that are the most suitable for the user.

When a matchmaking request is initiated, the client game application and a back-end server hosting the game automatically negotiate the match. The client application sends the back-end server information relating to the client application and the user, such as the operating system (OS) language version, the game application language version, the language and time zone of the client application platform, the users' skill level, whether a chat function is on or off, and the number of incomplete games the user has intentionally abandoned since the last game the user played to completion. The back-end server generates a match based on the language settings, the users' skill level, and the users' abandoned game status. The user is not queried for any information at the time the match is initiated. All of the information that is sent to the hosting back-end server is obtained from system settings of the client application platform and any game option settings that the user may have previously made, but not in connection with initiating the matchmaking process of the present invention. An essential aspect of the present invention is that any user interface that is used for changing available parameter settings, whether system or user-specific, is separate from, and not part of, the matchmaking process.

Figure 2:
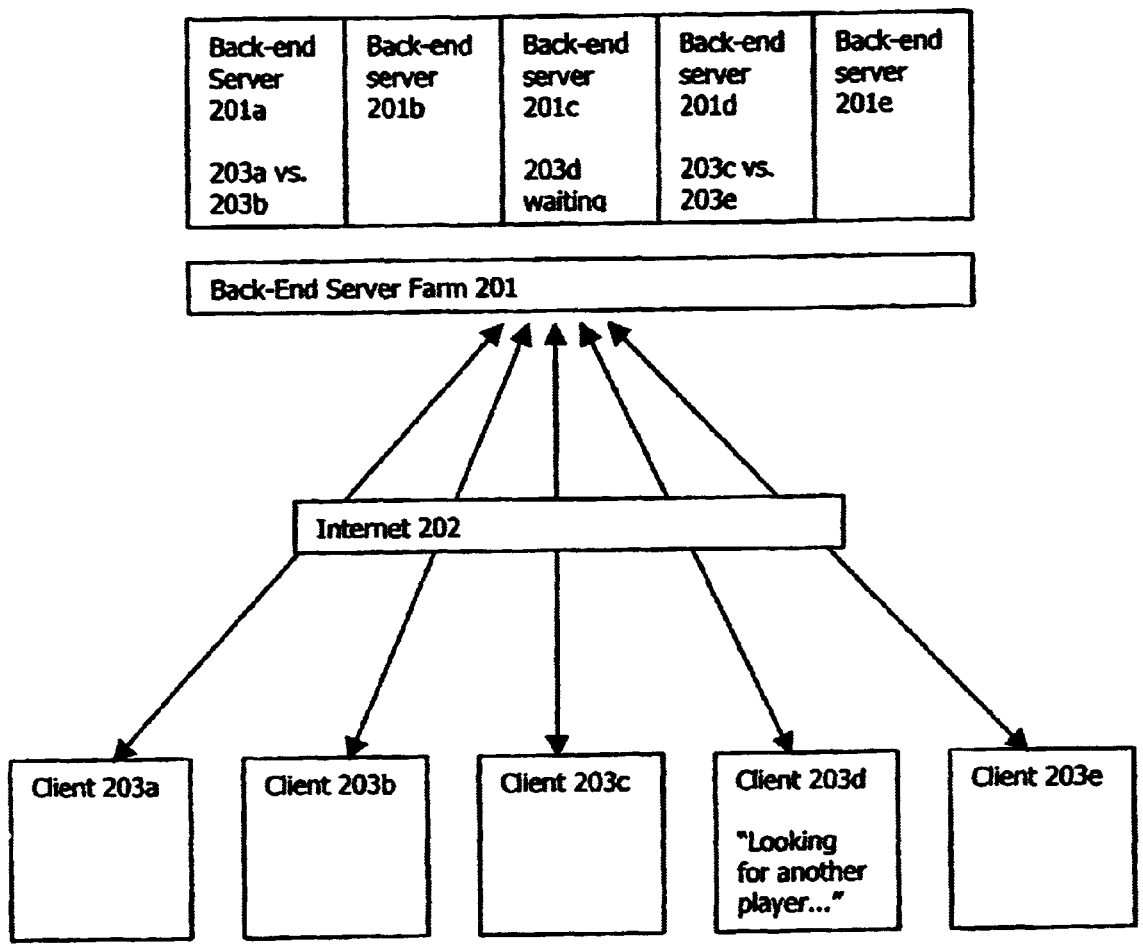
FIG. 2 shows a schematic block diagram of an exemplary network layout utilizing matchmaking according to the present invention.

FIG. 2 shows a schematic block diagram of an exemplary network layout 200 utilizing matchmaking according to the present invention. In FIG. 2, the network layout 200 includes a back-end server farm 201, a computer network 202, such as the Internet, and a plurality of client platforms 203a–203e. The back-end server farm 201 includes a plurality of back-end servers 201a–201e that each are connected to the computer network 202 in a well-known manner. Each of the client platforms 203a–203e is also connected to the computer network 202 in a well-known manner. FIG. 2 depicts that back-end server 201a is hosting a game in which client platforms 203a and 203b are opponents. Back-end servers 201b and 201e are available to host a game. Back-end server 201c is hosting a game in which client platform 203d is waiting for a matchmaking process to complete. Back-end server 201d is hosting a game in which client platforms 203c and 203e are opponents. It should be noted that although not illustrated, a single server might host more than one game at a time.

Figure 3:
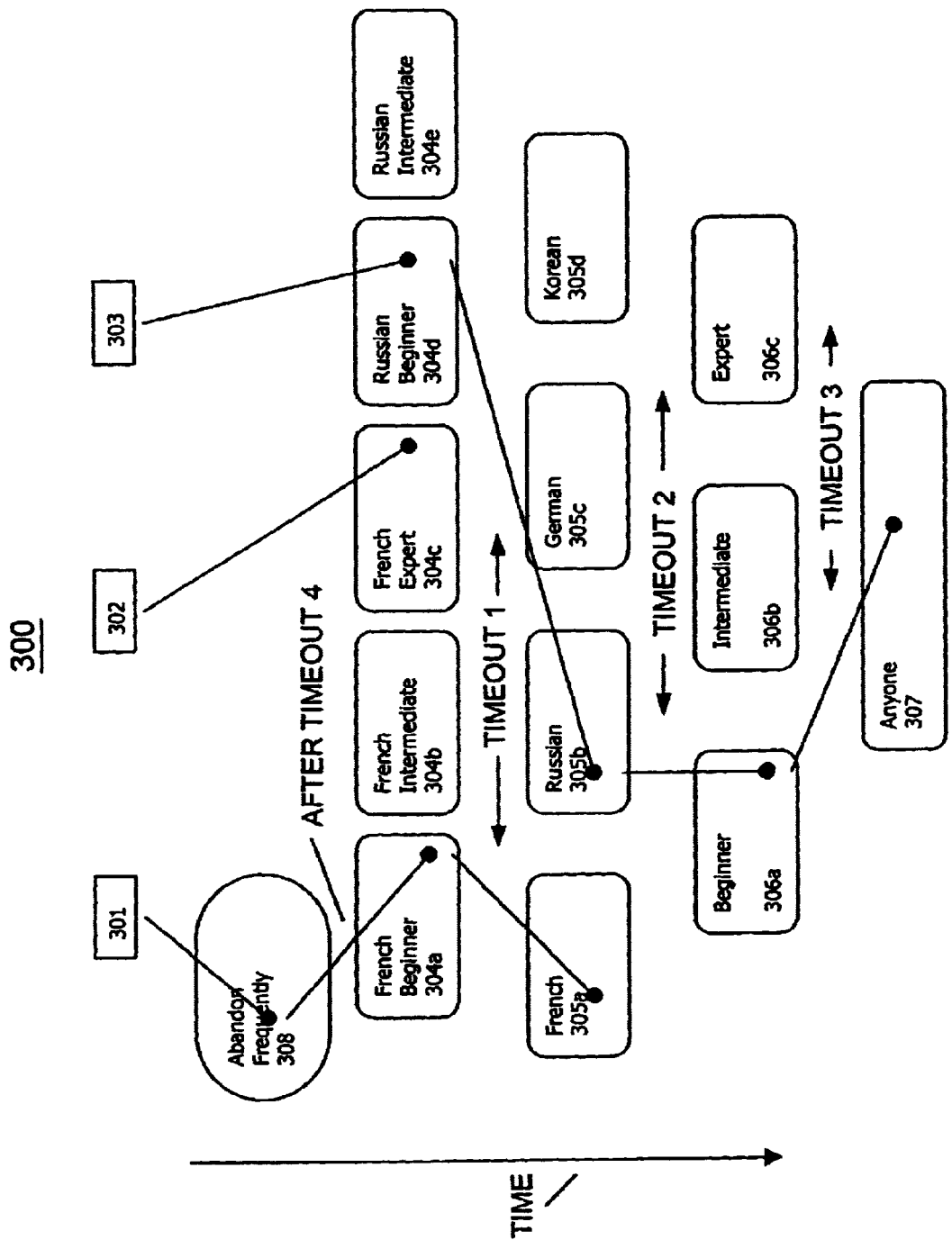
FIG. 3 depicts the timeout-based matchmaking process of the present invention.

A back-end server hosting a game performs the matchmaking process of the present invention based on a timeout scheme. FIG. 3 depicts the timeout-based matchmaking process hierarchy 300 of the present invention. The paths of three users 301–303 are shown for illustrating different aspects of the present invention. Matchmaking process hierarchy 300 includes four matching hierarchy levels 304–307. Hierarchy level 304 includes exemplary matching bins 304a–304e that each represents a different combination of a preferred language matching criterion and a skill level matching criterion. For example, matching bin 304a represents the combination of French as the preferred language and a beginner skill level. Hierarchy level 305 includes exemplary matching bins 305a–305d that each represents a different preferred language-matching criterion. Exemplary matching bin 305b represents Russian as the preferred language. Hierarchy level 306 includes exemplary matching bins 306a–306c that each represents a different skill level-matching criterion. Exemplary matching bin 306c represents an expert skill level. Hierarchy level 307 includes only one matching bin that represents an anyone matching criterion. While only a few bins are shown in levels 304–306, it should be understood that each of levels 304–306 could include other matching hierarchy bins in addition or alternatively to the exemplary matching bins that are shown in FIG. 3. Additionally, it should be understood that the matchmaking process can be performed on a distributed basis among a plurality of back-end servers, or can be performed on a selected back-end server. In either case, the server farm then hosts the subsequent game resulting from the matching process in a well-known manner.

Preferably, there are no English language bins contained in levels 304 and 305, thereby insuring that users who speak a language having a relatively low-usage (i.e., French and Russian) will still experience an exceptionally quick matchmaking process. This is based on the assumption that most users will speak English and, consequently, will immediately advance to skill level bins 306 and generally be matched with other English-speaking users. Relatively low-usage language users who fall to skill level bins 306 will also be matched without having to wait in the skill level bins 306 and the anyone bin 307 for another relatively low usage language user. Although the preferred embodiment of the present invention implements the hosting of a game, hosting of a game is not required for the invention. In fact, the matchmaking process might not even be for a server-based game. For example, at the completion of matchmaking, the server may send the clients each others' IP addresses, at which point the clients would connect directly to each other for playing the game with no further involvement from the server farm.

Time advances from the top to bottom of FIG. 3 as represented by the downward arrow at the left side of the figure. As users enter the matching hierarchy from the top, they filter down through the matching hierarchy, keeping a presence in all of the matching bins in which they have ever existed, or have been grouped. A match is consummated as soon as a bin contains at least the number of players required for a game; that is, as soon as sufficient players have been found for a game without violating any timeout restrictions. When a match is consummated, all matching players are removed from the matching hierarchy.

When a back-end server receives a one-action match request from a user, the back-end server attempts to match the user only with other players having the same skill level and who speak the same language for the duration of a first selectable period of time. This is represented in FIG. 3 by users 302 and 303 moving from their respective initial positions to matching bins 304c and 304d, respectively, in the matching hierarchy. More specifically, after a one-action request is received from user 302, user 302 moves from an initial position to matching bin 304c in matching hierarchy 300 for the first selectable period of time. Preferably, the first selectable period of time is about 1 second and is uniformly set for all users entering first levels 304 in matching hierarchy 300. Alternatively, the first selectable period of time can be customized for each user based on parameters such as the particular game selected, the preferred language, the skill level, the time of day, etc.

Matching bin 304c in matching hierarchy 300 of FIG. 3 represents a matching bin in which the back-end server hosting the particular game that user 302 intends to participate in attempts to match user 302 with another (1) French-speaking player who has (2) an expert skill level. Accordingly, for user 302 to have moved to matching bin 304c, the information supplied to the back-end server after the one-action matching request was received specified that user 302 was a French-speaking player having an expert skill level.

User 303 moves to matching bin 304d in matching hierarchy 300 after a one-action match request is received from user 303. Matching bin 304d represents a matching bin in matching hierarchy 300 in which the back-end server hosting the particular game that user 303 intends to participate in attempts to match user 303 with another (1) Russian-speaking player who has (2) a beginner skill level. For user 303 to have moved to matching bin 304d, the information supplied to the back-end server after the one-action matching request was received specified that user 303 was a Russian-speaking player having a beginner skill level.

After the first period of time elapses, a second selectable period of time begins in which a back-end server attempts matches a user with other players having the same language, regardless of the respective skill levels of the user and other players. This is depicted in FIG. 3 by user 303 moving to matching bin 305b, which represents a matching bin in matching hierarchy 300 in which the back-end server hosting the particular game that user 303 intends to participate in attempts to match user 303 with another Russian-speaking player regardless of skill level. For user 303 to have moved to matching bin 305b, the back-end server did not find a sufficient number of other players that were suitable for user 303 during the first predetermined period of time. Preferably, the second selectable period of time is about 1 second and is uniformly set for all users entering second levels 305 in the matching hierarchy. Alternatively, the second selectable period of time can be customized for each user based on parameters such as the particular game selected, the preferred language, the skill level, the time of day, etc.

After the second period of time elapses, a back-end server attempts to match a user with any other player having the same skill level, regardless of preferred language, for a third selectable period of time. This is depicted in FIG. 3 by user 303 moving from matching bin 305b to matching bin 306a, which represents a matching bin in matching hierarchy 300 in which the back-end server hosting the game that user 303 intends to participate in attempts to match user 303 with any other player having a beginner skill level regardless of preferred language. For user 303 to have moved to matching bin 306a, the back-end server did not find a sufficient number of other players that were suitable for user 303 during the second predetermined period of time. Preferably, the third selectable period of time is about 10 seconds and is uniformly set for all users entering third levels 306 in the matching hierarchy. Alternatively, the third selectable period of time can be customized for each user based on parameters such as the particular game selected, the preferred language, the skill level, the time of day, etc.

When the third period of time elapses without a match, a back-end server attempts to match a user with any other player, regardless of language or skill level. This is depicted In FIG. 3 by user 303 moving from matching bin 306a to matching bin 307, which represents a matching bin in matching hierarchy 300 in which the back-end server hosting the game that user 303 intends to participate in attempts to match user 303 with any other player, regardless of language or skill level. User 303 will remain at matching bin 307 in matching hierarchy 300 until a sufficient number of other players are found.

In the situation when a user has a history of abandoning a large number of games, i.e., a poor abandoned game status, a back-end server attempts to match the user only with other players having a similarly poor abandoned game status. This is represented in FIG. 3 by user 301 moving from an initial position to hierarchy matching bin 308. User 301 remains in matching bin 308 for a fourth predetermined period of time. Preferably, the fourth selectable period of time is about 20 seconds and is uniformly set for all users entering fourth level 308 in matching hierarchy 300. Alternatively, the fourth selectable period of time can be customized for each user based on parameters such as the particular game selected, the preferred language, the skill level, the time of day, etc.

After the fourth predetermined period of time elapses, user 301 moves to matching bin 304a in matching hierarchy 300. Only when the abandoned game matching criteria for a frequently abandoning player fails after the fourth predetermined period of time does the back-end server hosting the game perform the matching process as previously described. As shown in FIG. 3, user 301 is not matched with a sufficient number of other players at matching bin 304a before the first predetermined period of time elapses. Consequently, user 301 moves to matching bin 305a where a match is consummated. A user having a poor abandoned game status will always move first to matching bin 308 in matching hierarchy 300 until the users' abandoned game status diminishes.

Additionally or alternatively, the matching hierarchy of the present invention can provide a special matching bin for users having a special status, such as a supreme expert skill level or another selected preferred user status. For this type of situation, a back-end server attempts to match a user having such a special status only with other players having a similar special status for a predetermined period of time before entering the normal matching hierarchy.

Once a match has been made, all matching players are removed from the matching hierarchy, and the back-end server sends a network message to each respective client application involved in the match indicating that the matchmaking process is complete. The respective client applications are also provided with the identities of the matched players, their respective positions of play, and other information about each other player, such as their respective languages, skill levels, and chat settings. The game then begins. As previously described, hosting of a game is not required for the invention. For example, at the completion of matchmaking, the server may send the clients each others' IP addresses, at which point the clients would connect directly to each other for playing the game with no further involvement from the server farm.

Figure 4A:
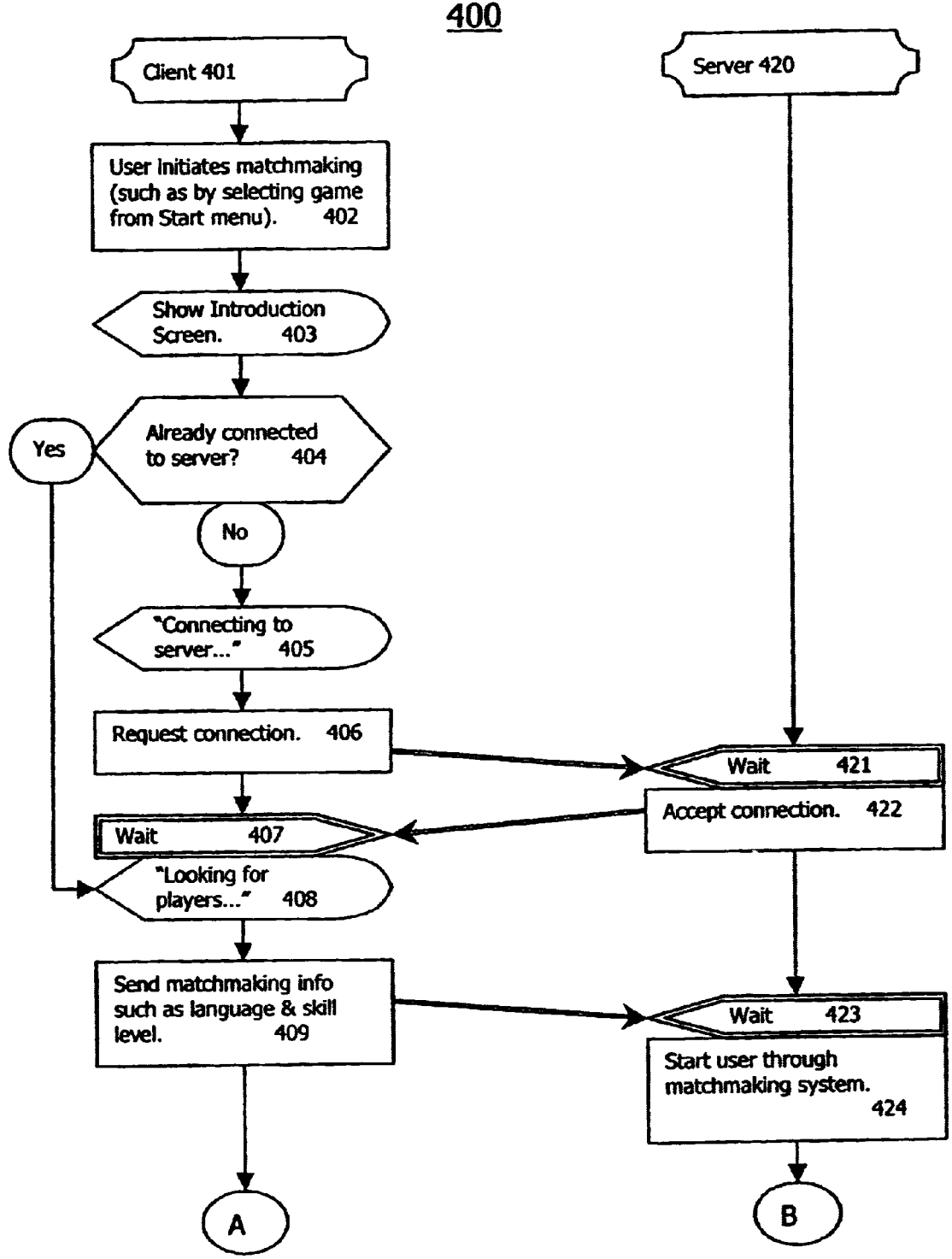
FIGS. 4A and 4B show a flow diagram of the matchmaking process according to the present invention.
Figure 4B:
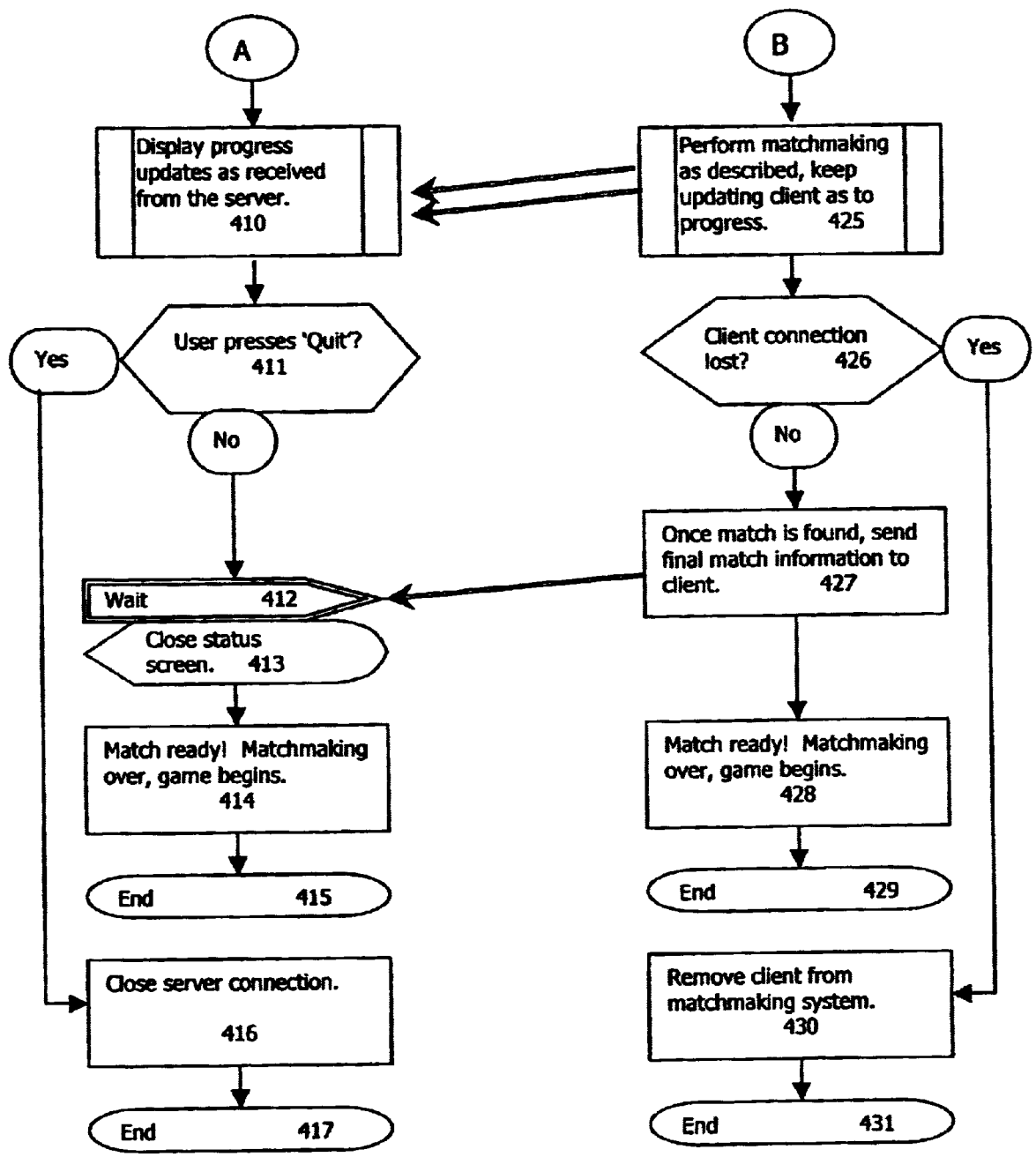

Whenever a user has initiated one-action matchmaking, the client application and back-end server negotiate a match. FIGS. 4A and 4B show a flow diagram 400 of the matchmaking process negotiation performed by a client application 401 and a back-end server 420. At step 402, a user at client application 401 initiates matchmaking by a single action, such as a single click on a graphical interface button or a single keyboard entry. Other single actions that could be alternatively performed by a user include speaking a voice command that is recognized by client application 401, or by entering a command by remote control, such as by infrared control or by radio control. Flow continues to step 403 where a graphical introduction screen is displayed. The first time a user initiates the one-action matching technique of the present invention for a particular game, the graphical introduction screen is preferably displayed providing the user with a description of the game and an option for continuing or canceling. In an alternative embodiment of the present invention, the user can optionally turn off the introduction screen, in which case the next time the user selects the game, a graphical status screen is immediately displayed.

When the user chooses to continue from the introduction screen by, for example, clicking the "Play" button, flow continues to step 404 where the client application 401 determines whether a connection to the back-end server 420 hosting the selected game has already been established. When client application 401 is already connected to back-end server 420 by, for example, a persistent TCP connection, flow continues to step 408. When client application is not already connected to back-end server 420, flow continues to step 405 where a graphical status screen is displayed containing, for example, the text "Connecting to the Internet game server . . . ".

Flow continues to step 406, where a request for a connection to back-end server is sent in a well-known manner (i.e., a TCP-level communication) from client application 401 to back-end server 420 over a computer network, such as the Internet. Client application 401 enters a wait mode at step 407 waiting for a response from back-end server 420.

Back-end server 420, which has been in a wait mode with respect to client application 401 (and, for that matter, all client applications that can potentially connect to back-end server 420), receives the request at step 421. At step 422, back-end server 420 accepts the connection, and preferably sends a TCP-level communication to client application 401 that the connection has been accepted. At step 423, back-end server 420 enters a wait mode waiting for information about the client application and requesting user for finding suitable players.

While client application 401 is in a wait mode in step 407, an acknowledgement of the connection is received from back-end server 420. Flow continues to step 408 where the graphical status screen is updated to show that the connection to back-end server 420 has been made and that suitable players are now being sought. For example, the status screen can display a message indicating the number of players still needed to start the game. In the situation when a player is either new or has a beginner skill level for the card game Spades, the message can indicate, for example, "Looking for three Beginner Spades players . . . ". As long as matchmaking is proceeding, an animated icon is displayed on the status screen indicating to the user that the matchmaking process is proceeding and that the user should continue to wait. When any error occurs during the matching process, the animated icon stops moving and an error message box is displayed presenting "Quit" and "Retry" options for the user.

Flow continues to step 409 where client application 401 collects information for the matchmaking process, such as the operating system (OS) language version, the game application language version, the language and time zone of client application platform, the users' skill level, whether a chat function is on or off, and the number of incomplete games the user has intentionally abandoned since the last game the user played to completion. The user is not queried for any of this information at the time the user chooses to be matched. All of the information is collected from system settings, usage statistics, and game option settings that the user may have made previously, potentially without even realizing that matchmaking would be affected. Client application 401 sends the matchmaking information to back-end server 420.

Back-end server 420 receives the matchmaking information from client application 401 at step 423 and begins the matchmaking hierarchy at step 424. At step 425, back-end server 420 performs the matchmaking process and sends messages to client application 401 in a well-known manner updating the progress of the search. As the matchmaking is proceeding, back-end server 420 continues at step 426 to determine whether the connection with client application 401 has been lost. If so, flow continues to step 430 where the client application is removed from the matchmaking system, and at step 431 the process with respect to client application 401 ends.

Figure 5:
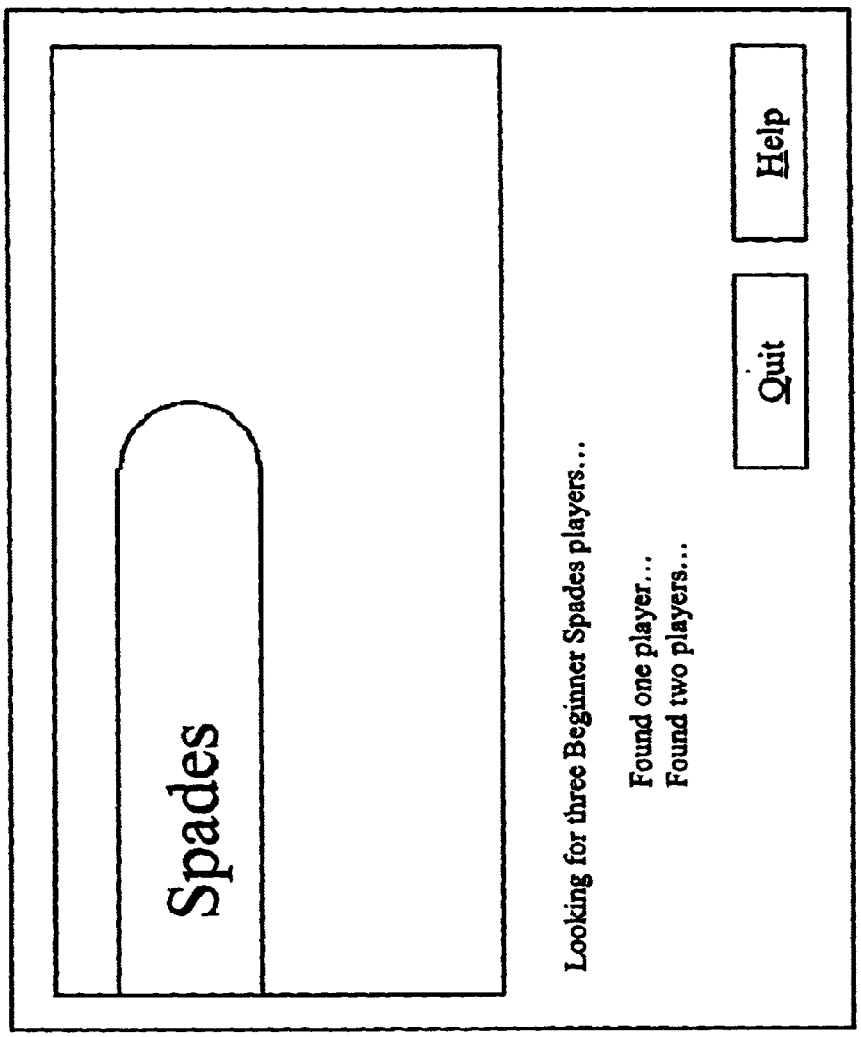
FIG. 5 shows an exemplary graphical status screen according to the present invention.

At step 410, client application 401 receives the progress updates and updates the display keeping the user informed of the progress. FIG. 5 shows an exemplary graphical status screen 500. As back-end server 420 finds other players to complete the match, updated messages preferably appear one below another on the status screen, such as "Found one player. . . ", "Found two players . . . ", etc. A user can optionally cancel a matchmaking process at any time before the process completes by clicking the "Quit" button on the status screen. Consequently, as client application 401 waits for matchmaking progress information, client application 401 continues to check at step 411 whether the user has decided to quit the process by selecting the "Quit" button displayed on the status screen. If so, flow continues to step 416 where client application 401 closes the server connection and the process ends at step 417. If not, flow continues to step 412 where client application 401 continues to wait for the matchmaking process to successfully complete.

At step 427, back-end server 420 completes the matchmaking processing by finding a sufficient number of players for the users' selected game and sends the match information to client application 401 in a well-known manner. Flow then continues to step 428 for back-end server 420 where the matchmaking process is over. The matchmaking process ends for back-end server 420 at step 429.

While client application 401 is waiting at step 412, client application 401 continues to receive matchmaking progress updates from back-end server 420. In an exemplary situation when a total of four players are needed to begin the game selected by the user, and back-end server 420 has found three suitable players, the status display is updated to indicate "Found three players . . . ", at which point the matchmaking process is complete. Flow continues to step 413 where the status screen is closed.

The game begins at step 414 where a game board and a chat pane are displayed. The process ends for client application at step 415. The three other players appearing in the users' display of the game and chat pane are the three players that were automatically matched by the back-end server during the matchmaking process.

Once in a game, there are several ways matchmaking can be restarted, all initiated by a single user action. The user can select "Find New Opponents" from a menu bar at any time. This particular action removes the user from the current game and takes the user directly to the "Looking for three Beginner Spades players . . . " status message. Because this action abruptly ends the users' game, a confirmation dialog box is preferably displayed to the user before the current game is actually closed. (This particular action would, of course, also count towards a detrimental abandon game status for the user.) When the game the user is playing ends for some other reason, including that the game is over, a "New Opponents" button is automatically displayed for the users. This button also initiates a new automatic matchmaking session for the user.

While the matchmaking process of the present invention has been described as being based on two parameters, i.e., an operating system parameter of the client computer in combination with a user-selectable parameter relating to the user, the entire matchmaking process can be based on any number of parameters with a corresponding number of matchmaking hierarchy levels. The particular matching hierarchy order that a user traverses in attempting to produce a match with another player is completely optional and depends, for example, upon the particular client application in which a user is being matched. For example, a matchmaking process according to the present invention can be based on two client computer system parameters, i.e., an operating system language of the client computer and a time zone in which the client computer is located, in combination with one user-selectable parameter relating to the user, i.e., the skill level of the user. For this particular example, the first hierarchy level of the matchmaking process would attempt to match a user to other players who match all three matching parameters. The first two system parameters can be considered before the user-selectable parameter is considered. Alternatively, the user-selectable parameter can be considered first before the two system parameters are considered.

One alternative embodiment of the back end server portion of the invention is a filter-based matchmaking process. For this alternative embodiment, when a user requests a match, a filter is created on the back-end server based on the users' matching information (i.e., profile and preferences) received from the client application. The filter is then compared to each other waiting users' filter to see if the two users are compatible; that is, each passes the others' filter. If so, those two users become "attached". Whenever sufficient players become mutually attached, all to each other, they form a match. For example, in a two-player game any two users who become attached would be matched. With three players, whenever three users were attached in a triangle formation, each one to the other two, they would be matched, and so on for larger numbers of players. This matchmaking mode could be further extended by having the filters become more inclusive as time elapsed, similar to the timeouts used in the bin hierarchy system of the present invention.

Yet another alternative embodiment of the back-end server portion of the invention is to match users with other players as they arrive, on a first-come first-served basis, thereby providing the shortest possible wait time. This mode would not require any system or user settings to be gathered and sent to the server for the purpose of matchmaking.

Alternatively, the collection of user preferences and settings used by a back-end server can vary from implementation to implementation. For example, one particular game application can have only a single option available that explicitly affects matchmaking, i.e., skill level. Another particular game application may have many user selectable options that explicitly affect matchmaking. For example, personal information, such as age and/or city, might be selectable for affecting matchmaking. Another example might include desired game settings, such as whether jumping is mandatory in checkers. Yet another example might include preferences for particular classes of opponents, such as all players being Scorpios. In addition to explicit settings within an application, one-action matchmaking according to the present invention can take advantage of any number of system settings. Additionally, non-identical clients could send different sets of settings to the host machine and still participate in matchmaking with each other, where perhaps the host provided default settings for the missing parameters. In all cases, an essential aspect of the invention is that any user interface that is used for changing available parameter settings is separate from, and not part of, the matchmaking process.

Additionally, the status screen displaying progress during matchmaking can also take many different forms and convey more or less information regarding the matchmaking process. Moreover, the status screen can even provide an alternative activity for the user, such as a mini-game like tic-tac-toe, while the user waits for the matchmaking process to complete. Yet another alternative includes representing the matchmaking process of the present invention by only an icon and the user is alerted in some manner, i.e., visually and/or audibly, when the matchmaking process is complete. Still another alternative to the preferred status screen is to omit the status screen completely and notifying the user only when the matchmaking process is complete or when an error is encountered.

The present invention is not limited to gaming applications. Of course, the matchmaking process of the present invention can be used for matching users for chat environments, tutoring, any kind of online competition, discussion groups, live help and support, buying and selling, romance, etc. Further, the one-action matchmaking of the present invention can be used for "join-in-progress" application, as opposed to a discreetly matched application, such as an Internet game. That is, a particular implementation of the present invention can allow people to join games (or another activity) after the initial match has already occurred, such as in a free-for-all, first-person shooter game. In such a situation, the back-end server would inform the client application about the current state of the game into which the user has been matched. The user would be added to the game and would immediately begin playing. Different users would arrive in the same game at different times during such a scenario.

While the present invention has been described in connection with the illustrated embodiments, it will be appreciated and understood that modifications may be made without departing from the true spirit and scope of the invention.

What is claimed is:

1. A method for matching users over a computer network, the method comprising steps of:

receiving a one-action input at a requesting client application executing on a computer connected to the computer network, the one-action input being received from a requesting user associated with the requesting client application;

sending at least one message from the requesting client application to a host computer connected to the computer network, the message containing information relating to a request for initiating a matchmaking process on the host computer, the matchmaking process matching the requesting user into an online session instance along with other suitable users automatically, without further input being received from the requesting user associated with the requesting client application, each suitable user being connected to the computer network through a client application that is compatible with the requesting client application;

receiving at the host computer the at least one message from the requesting client application; and matching the requesting user into an online session instance with other suitable users determined to match the requesting user, wherein the step of matching the requesting user into an online session matches the requesting user during a first predetermined period of time based on information relating to at least one operating parameter of the computer on which the requesting client application is executing and at least one user-defined parameter relating to the requesting user, wherein when the requesting user has a predetermined user status with respect to the requesting client application, the step of matching the requesting user into an online session matches the requesting user during a second period of time with other users that have the predetermined user status with respect to a client application corresponding to the requesting client application, wherein the predetermined user status based on a predetermined number of abandoned games.

2. The method of claim 1, wherein the predetermined user status further is based on one of: a skill level of the requesting user and a language setting of the requesting user.

3. A method for matching users over a computer network, the method comprising steps of:

receiving at a host computer at least one message from a requesting client application executing on a client computer, the host computer and the client computer being connected to the computer network, the message containing information relating to a request for initiating a matchmaking process on the host computer, the matchmaking process matching a requesting user associated with the requesting client application into an online session instance along with other suitable users, automatically, without further input being received from the requesting client application, each suitable user being connected to the computer network through a client application corresponding to the requesting client application;

matching the requesting user into an online session instance with other suitable users determined to match the requesting user, wherein when the requesting user has a predetermined user status with respect to the requesting client application, the step of matching the requesting user into an online session matches the requesting user during a first predetermined period of time with other suitable users that have the same predetermined user status with respect to a client application corresponding to the requesting client application, wherein the predetermined user status is based on a predetermined number of abandoned games.

4. The method of claim 3, wherein the predetermined user status further is based on one of: a skill level of the requesting user and a language setting of the requesting user.

5. A method for matching users over a computer network, the method comprising steps of:

receiving a one-action input at a requesting client application executing on a computer connected to the computer network, the one-action input being received from a requesting user associated with the requesting client application;

sending at least one message from the requesting client application to a host computer connected to the computer network, the message containing information relating to a request for initiating a matchmaking process on the host computer,. the matchmaking process matching the requesting user into an online session instance along with other suitable users automatically, without further input being received from the requesting user associated with the requesting client application, each suitable user being connected to the computer network through a client application that is compatible with the requesting client application;

receiving at the host computer the at least one message from the requesting client application; and matching the requesting user into an online session instance with other suitable users determined to match the requesting user, wherein when the requesting user has a predetermined user status with respect to the requesting client application, the step of matching the user into an online session matches the requesting user during a first predetermined period of time with other users that have the same predetermined user status with respect to a client application corresponding to the requesting client application, wherein the predetermined user status is based on a predetermined number of abandoned games.

6. The method of claim 5, wherein the predetermined user status automatically changes in response to determining whether a predetermined number of games have been completed without abandonment.

7. The method of claim 5, wherein the predetermined user status further is based on one of: a skill level of the request user and a language setting of the requesting user.

8. A method for matching users over a computer network, the method comprising steps of:

determining an abandoned game status of a requesting user; and matching the requesting user with a second user based on the abandoned game status.

9. The method of claim 8, wherein the abandoned game status includes a number of incomplete games the requesting user has abandoned since the last game the requesting user has played to completion.

10. The method of claim 8, wherein the abandoned game status automatically changes in response to determining whether a predetermined number of games have been completed without abandonment.

11. The method of claim 8, wherein the step of matching the requesting user includes matching based on an abandoned game status of the second user.

12. The method of claim 8, wherein the step of matching the requesting user with a second user is further based on one of: a skill level of the requesting user and a language setting of the requesting user.

13. The method of claim 8, wherein the step of matching the requesting user with a second user is further based on a special status of the requesting user.

14. The method of claim 8, wherein the step of matching the requesting user with a second user is further based on one of: a time zone in which the requesting user is located, personal information of the requesting user, desired game settings, and preferences for particular classes of opponents.

* * * * *

UNITED STATES PATENT AND TRADEMARK OFFICE
CERTIFICATE OF CORRECTION

PATENT NO. : 6,641,481 B1
DATED : November 4, 2003
INVENTOR(S) : Jason Mai et al.

It is certified that error appears in the above-identified patent and that said Letters Patent is hereby corrected as shown below:

<u>Title page,</u>
Item [56], References Cited, OTHER PUBLICATIONS, insert the following:
-- Internet Explorer keyboard shortcuts, Microsoft, 1995 --

<u>Column 1,</u>
Line 35, replace "online" with -- online matchmaking process. --

<u>Column 13,</u>
Line 26, replace "status based" with -- status is based --.

Signed and Sealed this

Thirteenth Day of July, 2004

JON W. DUDAS
*Acting Director of the United States Patent and Trademark Office*